United States Patent Office 3,803,272
Patented Apr. 9, 1974

3,803,272
PROCESS FOR PREPARING TETRAKIS(2-HALO-ALKYL) ALKYLENE DIPHOSPHATES
Philip M. Pivawer, Hamden, Richard J. Turley, Orange, and Philip D. Hammond, North Haven, Conn., assignors to Olin Corporation
No Drawing. Filed Aug. 25, 1972, Ser. No. 283,975
Int. Cl. C07f 9/08
U.S. Cl. 260—973        10 Claims

ABSTRACT OF THE DISCLOSURE

An improved process is disclosed for the preparation of tetrakis(2 - haloalkyl) alkylene diphosphates which are useful flame retardant additives for polyurethane foam. The process comprises (a) preparing a tris(2-haloalkyl) phosphite by reacting an alkylene oxide with a phosphorus trihalide in the presence of a tertiary amine hydrohalide catalyst,
(b) reacting the tris(2-haloalkyl) phosphite with a halogen to form bis(2-haloalkyl) phosphorohalidate, and
(c) reacting the bis(2-haloalkyl) phosphorohalidate with an alkylene glycol in the presence of a tertiary amine to form tetrakis(2-haloalkyl) alkylene diphosphate and a tertiary amine hydrohalide.

---

This invention relates to an improved process for the preparation of tetrakis(2-haloalkyl) alkylene diphosphates of the formula

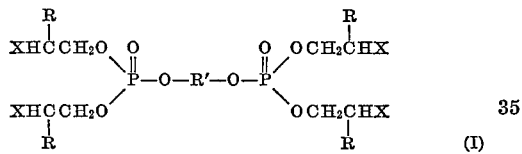

wherein
R' is an alkylene radical having 1–8 carbon,
R is hydrogen or an alkyl radical having 1–6 carbons, and
X is halogen.

These phosphate diesters have been found to be highly useful as flame retardant additives for polyurethane foam. A detailed description of the utility of these compounds is provided in U.S. application Ser. No. 8,040, filed Feb. 2, 1970, now Pat. 3,707,586, the entire disclosure of which is incorporated by reference herein.

The phosphate diesters of Formula I can be generally prepared by a sequence of steps involving (1) the reaction of an alkylene oxide with a phosphorus trihalide at controlled, low temperatures to form tris(2-haloalkyl) phosphite, (2) the reaction of the tris(2-haloalkyl) phosphite with a halogen to form a mixture comprised of bis (2-haloalkyl) phosphorohalidate and alkylene dihalide, (3) reaction of the phosphorohalidate with an alkylene glycol in the presence of a basic catalyst to form tetrakis (2-haloalkyl) alkylene diphosphate.

However, it has now been found that tetrakis(2-haloalkyl) alkylene diphosphates which are prepared according to the above-summarized method invariably contain a relatively substantial proportion of phosphonate impurities. The molecular structure of these phosphonates has recently been identified to be the following:

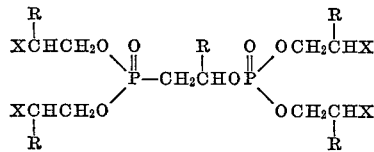

wherein R and X have the significance indicated above.

These phosphonate impurities which are very difficult if not impossible to remove, are highly undesirable particularly when the phosphate diesters containing them are used as flame retardant additives for polyurethane foam; for it has been found that these phosphonates have a detrimental effect on the physical properties of the foam. For example, they detrimentally alter the dry heat aging properties of the foam.

Another drawback connected with the above-summarized method for the preparation of tetrakis(2-haloalkyl) alkylene diphosphate is that it does not provide an overall economically feasible process for preparing these phosphate diesters. For example, inefficient utilization of reactants and intermediates and the use of costly purification or separation techniques detract from the practical utility of this method. Thus a need still exist in the art for a process which overcomes these drawbacks and provides an economically and technically viable method for the preparation of tetrakis(2 - haloalkyl)alkylene diphosphates in improved purity and yield.

Now in accordance with this invention an improved process has been found for the preparation of these diesters. The process of the invention comprises (a) reacting an alkylene oxide with a phosphorus trihalide in the presence of a tertiary amine hydrohalide catalyst to form tris(2-haloalkyl) phosphite,
(b) reacting the tris(2-haloalkyl) phosphite with a halogen, at a temperature of about −10° C. to about 150° C., to form a solution mixture comprised of bis(2-haloalkyl) phosphorohalidate and alkylene dihalide,
(c) reacting the mixture obtained in step (b) with an alkylene glycol in the presence of a tertiary amine to form a mixture comprised of tetrakis(2-haloalkyl) alkylene diphosphate, alkylene dihalide, and a tertiary amine hydrohalide, the reaction being carried out at a temperature below about 75° C., and using, per each mole of the phosphorohalidate, about 0.5 mole of the glycol and at least about 0.85 mole of the tertiary amine, and
(d) recovering the tetrakis(2-haloalkyl) alkylene diphosphate.

More in detail, the reaction of the phosphorus trihalide with the alkylene oxide can be represented by Equation II as follows:

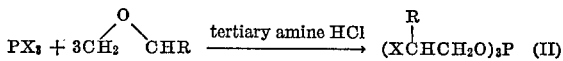

in which X and R have the significance indicated above.

In carrying out this reaction it is contemplated that any phosphorus trihalide may be employed, i.e., X can be chlorine, bromine, iodine or fluorine. However, it is prefered to employ those phosphorus trihalides in which the halogen is chlorine, bromine or a mixture thereof. Phosphorus trichloride is particularly preferred.

The alkylene oxide which is reacted with the phosphorus trihalide according to the process of the invention can be any alkylene oxide having a 1,2-epoxide ring. Illustrative are ethylene oxide, propylene oxide, butylene oxide, pentylene oxide, epichlorohydrin, trichlorobutylene oxide, hexylene oxide, octylene oxide, and the like. Usually these oxides contain from 2 to 8, and preferably from 2 to 4, carbon atoms. The most preferred alkylene oxide is ethylene oxide which when reacted with phosphorus trihalide according to the invention yields tris(2-haloethyl) phosphite.

Any suitable molar ratio of phosphorus trihalide to alkylene oxide may be employed. However, to prevent the occurrence of undesirable side effects resulting from the presence of excess or deficiency of alkylene oxide, and to make maximum use of the phosphorus trihalide, it is preferred to employ stoichiometric proportions of reactants, i.e., about 3 moles of alkylene oxide per each mole of the phosphorus trihalide. Nevertheless, under proper reaction conditions, it may be desirable or convenient to employ a small stoichiometric excess or deficiency of alkylene oxide.

The reaction is carried out in the presence of a tertiary amine hydrohalide catalyst, preferably a tertiary amine hydrochloride. The use of this type of catalyst, along with promoting a speedy reaction, enables carrying out the reaction at a relatively wide range of temperature and without the formation of undesirable by-products or the occurrence of undesirable side effects. The reaction of alkylene oxide with phosphorus trihalide in the presence of a tertiary amine hydrohalide catalyst is the subject of a U.S. patent application by P. M. Pivawer, Ser. No. 283,974, filed Aug. 25, 1972, entitled "Process for Preparing Tris(2-Haloalkyl)Phosphites," which application is filed concurrently herewith. The entire disclosure of that application is incorporated herein by reference.

In carrying out the reaction between the alklene oxide and the phosphorus trihalide, any suitable proportion of the catalyst may be employed. Usually, however, a catalytic proportion is employed such as from about 0.01 to about 6%, and preferably from about 0.2% to about 2%, by weight based on the weight of the phosphorus trihalide reactant.

The reaction of the phosphorus trihalide with the alkylene oxide may be carried out in the presence or absence of a solvent medium. However, the use of a solvent is preferred. For this purpose any inert organic liquid may be employed provided it is a solvent for both the catalyst and the phosphorus trihalide reactant. Ethylene dichloride is a particularly preferred solvent and this can be used in any suitable proportion such as about 50–1000 parts by weight per every 100 parts of the combined weight of phosphorus trihalide and alkylene oxide. It is also preferred to carry out the reaction in the absence of moisture. Any suitable means, such as the use of a blanket of nitrogen gas, may be employed for this purpose.

Any convenient order of mixing the reactants and catalyst may be employed in carrying out the reaction represented by Equation I above. However, it is preferred to simultaneously add the reactants, solvent, if such is used, and catalyst to a reactor. This procedure is more adaptable to continuous operation in accordance with the preferred embodiments of the invention. So charged to a reactor, the reactants and catalyst are agitated whereupon reaction proceeds usually spontaneously. In some instances, however, it may be necessary or desirable to use some heat initally in order to commence the reaction. As the reaction proceeds, the temperature of the reactive mixture may be maintained at any suitable level, such as from about —10° C. to about 150° C. However, it is preferred to carry out the reaction at a temperature range of about 0–130° C. and most preferably at about 40–115° C. Conventional means can be suitably employed to achieve and maintain such temperatures. In accordance with a preferred embodiment of the invention, temperature control within the preferred range of about 40–115° C. is conveniently achieved by operating under reflux conditions which also enables easy removal of any excess alkylene oxide that may be used.

Upon completion of the reaction, tris(2 - haloalkyl) phosphite is recovered as the only or main product of the reaction. Where the reaction is conducted in the presence of a solvent medium, the phosphite product will be in the form of a solution thereof in the solvent. In either case, according to the invention, the product phosphite is used directly in subsequent reactions without the need for any purification and/or solvent or catalyst removal.

The tris(2-haloalkyl) phosphite thus obtained is next reacted with a halogen, according to the invention, to produce a mixture of bis(2-haloalkyl) phosphorohalidate and alkylene diahalide. This second reaction may be represented by Equation III as follows:

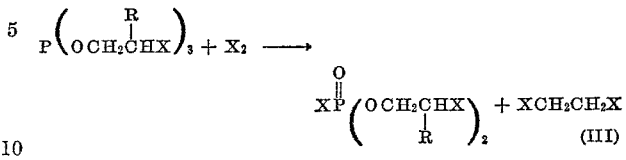

in which X and R have the significance indicated above.

The halogen which is employed in the reaction can be in the liquid or gaseous state, the latter being preferred. Although it is contemplated that any halogen may be employed as a reactant, it is preferred to employ chlorine or bromine, chlorine being particularly preferred.

Any molar ratio of halogen to phosphite may be employed in carrying out the reaction. For example stoichiometric proportions can be used. However, it is preferred according to the invention to employ a slight stoichiometric excess of halogen, such as from about 0.2% to about 20% by weight in excess of the stoichiometric amount. It has been found that the use of such excess, while insuring completion of the reaction, has no detrimental effect on the reaction product. The use of such an excess, furthermore, provides a practically easy means of ascertaining that all of the phosphite has been reacted. This is by virtue of the fact that the presence of excess halogen, indicating complete reaction of the phosphite, is signaled by the reactive mixture changing from colorless to colored, e.g., yellow color where the halogen is chlorine.

In carrying out the reaction represented by Equation III above, the tris(2-haloalkyl) phosphite, as obtained in the oxyalkylation of phosphorus trihalide, is placed in a reactor to which halogen is added simultaneously or subsequently. Simultaneous addition of phosphite and halogen is more adaptable to continuous operation in accordance with the preferred embodiments of the invention. It is also generally preferred to introduce the halogen into the reactor at a point below the surface of the phosphite. The reaction may proceed at any suitable temperature such as about —10° C. to about 150° C. However, it is preferred to employ a temperature of about 0–130° C. where the reaction is carried out on a continuous basis and about 20–80° C. where the reaction is carried out batch-wise. The most preferred reaction temperature ranges are about 40–115° C. for continuous operation and about 22–50° C. for batch operation. It has been found that the use of such temperatures speeds up the reaction while at the same time avoiding the occurrence of undesirable side effects. In continuous operation, according to the preferred embodiments of the invention, the reaction is carried out under reflux conditions which enable proper temperature control as well as the easy removal of excess halogen.

Upon complete reaction of the phosphite with the halogen, a product mixture is obtained which is comprised of bis(2-haloalkyl) phosphorohalidate and alkylene dihalide. This mixture, which may also comprise solvent as may have been used in the alkoxylation of phosphorus trihalide, is utilized directly in the final-step reaction of the process of the invention. Thus here again no intermediate separation steps are necessary according to the invention. If desired, however, any slight excess of halogen which may be present may be removed first by conventional techniques such as vacuum stripping or by adding additional phosphite until the color of the reaction mixture disappears.

In the third and last reaction which is employed according to the invention, two molecules of the phosphorohalidates are coupled together with one molecule of an alkylene glycol to yield tetrakis(2-haloalkyl) alkylene diphosphate. The preferred alkylene glycol is ethylene glycol.

Any suitable molar ratio of glycol to phosphorohalidate may be used. However, in order to achieve good product yields, e.g., about 75–92% by weight based on the weight of the phosphorus trihalide used in the first reaction, this reaction is carried out preferably using stoichiometric proportions of reactants, e.g., about 0.5 mole of the glycol per each mole of the phosphorohalidate; for it has been found, according to the invention, that more-than-slight variations, e.g., ±10%, from the stoichiometric amounts detrimentally affect the yield of tetrakis(2-haloalkyl) alkylene diphosphate product.

Another important feature of this reaction, according to the invention, is that it be carried out in the presence of a tertiary amine catalyst. Any tertiary amine may be employed for this purpose. The following are illustrative:

pyridine
trimethyl amine
triethyl amine
2, 3, and 4 picoline
tributyl amine
N-methyl morpholine
trioctyl amine
tridodecyl amine
N,N-dimethyl aniline
quinoline
isoquinoline
N-alkyl-N-methyl aniline
N-benzyl-N-ethyl aniline
N-benzyl-N-ethyl-m-toluidine
N-methyl piperidine
N,N-dibenzyl aniline
N,N-diethyl-p-anisidine
N,N-diethylcyclyohexylamine
N,N-diisopropylethylamine
N,N-dimethylaniline
N,N-dimethylbenzylamine
N,N-dimethyl-p-toluidine
tribenzylamine
N,N,N',N'-tetramethylbenzidine
4-benzylpyridine.

The tertiary amine catalyst not only serves to promote the reaction and increase product yield, but it also acts as a scavenger for the by-product hydrohalic acid which is formed and whose presence might otherwise cause product decomposition. Thus the tertiary amine is preferably employed in more-than-catalytic proportions. Usually a molar proportion of at least 0.85 mole, and preferably at least about 1 mole, of the catalyst is employed per each mole of the phosphorohalidate. The most preferred molar range of tertiary amine used is about 1–1.5 moles per each mole of the phosphorohalidate. As indicated, the tertiary amine catalyst combines with the hydrohalic acid byproduct of the reaction thereby forming a tertiary amine hydrohalide. Thus a further advantage obtains in using this type catalyst which is that it provides a ready source of tertiary amine hydrohalide, which if desired, can be recycled in part for use in the oxyalkylation of phosphorus trihalide.

A still further important aspect of the reaction of the glycol with the phosphorohalidate is that it be carried out at a temperature below about 75° C. such as about 0–70° C. and preferably about 0–25° C. The use of such reaction temperatures has been found to maximize product yield and eliminate the formation of undesirable by-products such as pyrophosphates.

The reaction between the phosphorohalidate and the alkylene glycol may be represented by Equation IV as follows:

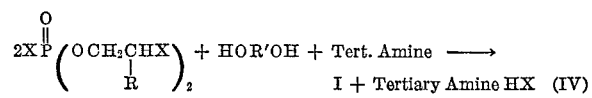
$$I + \text{Tertiary Amine HX} \quad (IV)$$

wherein X, R, and R' have the significance indicated above.

Any suitable order of mixing the reactants and catalyst together can be employed in carrying out the reaction represented by Equation IV. For example the phosphorohalide mixture may first be placed in a reactor followed by the addition of the glycol and the catalyst. However, in carrying out a continuous reaction according to the preferred embodiments of the invention, the phosphorohalidate mixture, glycol and catalyst are simultaneously introduced to the reactor. Using a temperature within the ranges specified above, the reaction is then allowed to take place and proceed to completion. Thereupon a crude product mixture is obtained which is comprised of tetrakis(2-haloalkyl) alkylene diphosphate, a tertiary amine hydrohalide and alkylene dihalide. Recovery of the diphosphate from this mixture can be achieved using conventional means. For example the crude mixture may be washed with a dilute mineral acid such as aqueous hydrochloric acid to selectively remove the tertiary amine hydrohalide as a solution thereof in the acid. Then the alkylene dihalide may be stripped off by distillation. This leaves a tetrakis(2-haloalkyl) alkylene diphosphate product which would be suitable for use as is in the production of flame retardant polyurethane foam. Advantageously according to the preferred embodiments of the invention, one or both of the tertiary amine hydrohalide and the alkylene dihalide, which are separated from the diphosphate ester product, are recovered and recycled for use in the process of the invention. In this manner, maximum utilization of materials can be achieved. Thus part of the tertiary amine hydrohalide can be recycled for use in catalyzing the alkoxylation of phosphorus trihalide; and/or part or all of the tertiary amine hydrohalide can be converted to the amine, such as by reaction with a basic material. Then, after conventional purification and drying operations, it can be recycled for use in the reaction of the phosphorohalidate with the alkylene glycol. By the same token, the alkylene dihalide which is separated from the final reaction product may be recycled for use as a solvent in the alkoxylation of phosphorus trihalide.

The process of the invention is especially adapted to the preparation of tetrakis(2-chloroethyl) ethylene diphosphate. Thus according to a particularly preferred embodiment of the invention, tetrakis(2-chloroethyl) ethylene diphosphate is prepared by a continuous process comprising the following continuous steps:

(A) Preparation of tris(2-chloroethyl) phosphite.— This step is accomplished by reacting, in a first reactor, phosphorus trichloride with ethylene oxide in the presence of pyridine hydrochloride. The reaction, carried out under the conditions specified hereinabove, is preferably conducted in the presence of solvent in which case a reaction product is obtained comprised of a mixture of tris-(2-chloroethyl) phosphite, pyridine hydrochloride and ethylene dichloride.

(B) Preparation of bis(2-chloroethyl) phosphorochloridate.—This step is accomplished by reacting the mixture product of step (A) with chlorine according to the reaction conditions set forth above. The mixture is fed into a second reactor to which chlorine, preferably in the gaseous state, is then added and allowed to react with the phosphite. The product of this reaction will be a mixture comprised of bis(2-chloroethyl) phosphorochloridate, pyridine hydrochloride and ethylene dichloride.

(C) Preparation of tetrakis(2-chloroethyl) ethylene diphosphate.—This step is accomplished by introducing the mixture obtained in step (B) into a third reactor to which ethylene glycol and a tertiary amine are also added. Again the reaction conditions specified earlier are employed in carrying out this reaction, the product of which will be a mixture comprised of tetrakis(-2-chloroethyl) ethylene diphosphate, a tertiary amine hydrochloride and ethylene dichloride.

(D) Recovery of tetrakis(2-chloroethyl) ethylene diphosphate.—Any convenient technique may be used to achieve this recovery.

In the most preferred embodiment of the invention, the recovery of tetrakis(2-chloroethyl) ethylene diphosphate is achieved with concurrent recovery and re-utilization of the ethylene dichloride and the tertiary amine hydrochloride. Thus according to this embodiment, step (D) above comprises the following steps:

(1) Separating the tertiary amine hydrochloride, converting it back to tertiary amine, and recycling this to the third reactor.

(2) Separatnig the ethylene dichloride, recycling it to the first reactor, and recovering the tetrakis(2-chloroethyl) ethylene diphosphate.

For purposes of illustration, steps (1) and (2) can be achieved as follows:

The mixture obtained in step (C) is washed with an aqueous solution of hydrochloric acid thereby forming an aqueous phase containing dissolved pyridine hydrochloride and a non-aqueous phase containing tetrakis(2-chloroethyl) ethylene diphosphate and ethylene dichloride. This washing step, along with enabling the separation of the pyridine hydrochloride, also serves to convert any excess pyridine which may be present to pyridine hydrochloride. The aqueous phase is then separated from the non-aqueous phase. The aqueous phase is treated with an inorganic base (,e.g., NaOH) to neutralize it and convert the pyridine hydrochloride to pyridine. A salt (e.g., NaCl) is formed as a by-product of this treatment. Distillation follows to separate the water and pyridine from the salt. Finally, the pyridine is recovered water-free by drying. This can be achieved for example by azeotropically distilling off the water with benzene, the latter being subsequently separated from the pyridine by fractional distillation.

The non-aqueous phase is neutralized by washing with a dilute aqueous solution of an inorganic base such as sodium bicarbonate. The water and ethylene dichloride are then removed, such as by vacuum stripping, to permit separation and recovery of tetrakis(2-chloroethyl) ethylene diphosphate. The water-ethylene dichloride mixture so removed is then subjected to distillation in order to recover water-free ethylene dichloride which is then recycled to the first reactor.

Thus recovered, the yield of tetrakis(2-chloroethyl) ethylene diphosphate usually ranges from about 75 to about 92% by weight based on the weight of the phosphorus trihalide which is used. The majority of the by-products having been removed in the washing step, this product will be of high purity, e.g., about 97–99% or higher purity.

The process of the invention is characterized by several advantages. It enables the preparation of tetrakis(2-haloalkyl) alkylene diphosphates in improved yield and relatively high purity. It does away with the need for isolating or separating the intermediate products for use in subsequent reactions according to the invention. Finally, the process of the invention enables making maximum use of materials employed and by-products formed in practicing the invention.

The following example is provided to illustrate the invention. In this example, all parts and percentages are by weight unless otherwise specified.

EXAMPLE

In a stirred reactor there were placed 1500 grams of ethylene dichloride, 15 grams of pyridine hydrochloride and 4124 grams (30 moles) of phosphorus trichloride. Moisture was excluded from the reactor by means of a drying tube or nitrogen purge. Ethylene oxide, 3960 grams (90 moles), was then added gradually over a period of 5 hours. The temperature inside the reactor was maintained at 25–50° C. The reaction took place spontaneously, tris(2-chloroethyl) phosphite being formed. It was completed within a few minutes after all the ethylene oxide was added. About 160 grams of the reaction product mixture were removed. Chlorine gas was then pumped into the reactor until the color of the mixture turned from colorless to yellow indicating that excess chlorine was present. Portions of the 160 grams of the removed product were returned to the reactor until the solution was colorless again. Throughout the chlorination step which took about 6 hours, the temperature of the reactor was maintained at 25–50° C. The bis(2-chloroethyl) phosphorochloridate which was thus formed was next reacted with ethylene glycol. For this purpose a mixture of 930 grams (15 moles) of ethylene glycol and 2550 grams (32.3 moles) of pyridine was added to the reactor gradually over a period of 6 hours. The temperature of the reactor was maintained at 15–20° C. The reaction again took place fairly rapidly with the resulting formation of tetrakis(2-chloroethyl) ethylene diphosphate.

To the resulting product mixture there was added a sufficient amount of dilute, aqueous hydrochloric acid to bring the pH to below 4. Two layers were thus formed, an aqueous layer containing pyridine hydrochloride and a non-aqueous layer containing tetrakis(2-chloroethyl) ethylene diphosphate and ethylene dichloride. The phases were separated and the non-aqueous phase was washed twice with 200 grams of water, the water being separated and added to the aqueous phase.

The combined aqueous phase was neutralized to pH 9 with a dilute aqueous solution of sodium carbonate. Benzene was added to the distillate and then the water was azeotroped off. The benzene was separated from the water-free pyridine by fractional distillation. Thus recovered the pyridine can be recycled for use again in the reaction of ethylene glycol with bis(2-chloroethyl) phosphorochloridate.

The non-aqueous layer was washed with 200 grams of a dilute, aqueous sodium carbonate solution followed by three repeated water washings. The volatiles were then stripped off in vacuo, the stripping operation being carried out in steps. Using a water aspirator, the ethylene dichloride was first used to azeotrope off most of the water at about 50° C. Then the temperature was raised to 80–90° C. and final stripping was carried out at high vacuum (i.e., 2.5 mm. of mercury) thereby enabling the recovery of 2890 grams of product. Analyzed by nuclear magnetic resonance, this product was found to be 97% pure tetrakis(2-chloroethyl) ethylene diphosphate. This corresponded to a calculated product yield, based on the amount of phosphorus trichloride used, of 82% by weight.

The combined, stripped volatiles consisted essentially of water and ethylene dichloride. The latter was dried by azeotropic distillation and as such it could be recycled for use in the ethoxylation of phosphorus trichloride.

What is claimed is:

1. An improved process for the preparation of tetrakis-(2-chloroethyl) ethylene diphosphate which comprises
  (a) reacting, at a temperature of about −10° C. to about 150° C., phosphorus trichloride with ethylene oxide to form tris(2-chloroethyl) phosphite, the reaction being carried out using about 3 moles of said ethylene oxide per mole of said phosphorus trichloride and in the presence of ethylene dichloride solvent and a tertiary amine hydrochloride catalyst,
  (b) reacting the product of reaction (a) with chlorine at a temperature of about 10° C. to about 150° C., to form a reaction product comprised of bis(2-chloroethyl) phosphorochloridate and ethylene dichloride,
  (c) reacting the product of reaction (b) with ethylene glycol in the presence of a tertiary amine to form a mixture comprised of tetrakis(2-chloroethyl) ethylene diphosphate, ethylene dichloride, and a tertiary amine hydrochloride, the reaction being carried out
    (i) using about 0.5 mole of said ethylene glycol and at least about 0.85 mole of said tertiary amine per each mole of said bis(2-chloroethyl) phosphorhalidate, and
  (ii) at a temperature of about 0–70° C., and
(d) recovering said tetrakis(2-chloroethyl) ethylene diphosphate from said mixture.

2. The process of claim 1 wherein each of reactions (a) and ((b) is carried out at a temperature of about 0–130° C.

3. The process of claim 2 wherein said tertiary amine hydrochloride is pyridine hydrochloride and said tertiary amine is pyridine.

4. The process of claim 2 wherein each of reaction (a) and (b) is carried out at a temperature of about 40–115° C. and under reflux conditions.

5. The process of claim 3 wherein a slight stoichiometric excess of said chlorine is employed in carrying out reaction (b), said chlorine being employed in the gaseous state.

6. The process of claim 5 wherein reaction (c) is carried out at a temperature of about 0–25° C.

7. The process of claim 6 wherein said ethylene dichloride and said pyridine hydrochloride are also recovered in step (d) as by-products.

8. A continuous process for the preparation of tetrakis-(2-chloroethyl) ethylene diphosphate which comprises the following continuous steps:
  (a) feeding into a first reactor phosphorus trichloride, ethylene dichloride solvent, pyridine hydrochloride catalyst and about 3 moles of ethylene oxide per each mole of said phosphorus trichloride, and allowing said phosphorus trichloride and said ethylene oxide to react at a temperature of about 0–130° C. and under reflux conditions thereby obtaining a first reaction product mixture comprised of tris(2-chloroethyl) phosphite and ethylene dichloride,
  (b) in a second reactor, placing and reacting together said first reaction product mixture and gaseous chlorine at a temperature of about 0–130° C. and under reflux conditions, thereby forming a second reaction product mixture comprised of bis(2-chloroethyl) phosphorochloridate and ethylene dichloride,
  (c) in a third reactor placing and reacting together, at a temperature of about 0–70° C., said second reaction product mixture and, per each mole of said phosphorochloridate, about 0.5 mole of ethylene glycol and at least about one mole of pyridine, thereby forming a third reaction product mixture comprised of tetrakis(2-chloroethyl) ethylene diphosphate, pyridine hydrochloride and ethylene dichloride,
  (d) removing said pyridine hydrochloride from said third reaction product mixture, converting it to pyridine and recycling it to said third reactor,
  (e) separating said ethylene dichloride from said third reaction product mixture, recycling it to said first reactor, and recovering said tetrakis(2-chloroethyl) ethylene diphosphate.

9. The process of claim 8 wherein the reaction of step (c) is carried out at a temperature of about 0–25° C.

10. The process of claim 9 wherein each of reaction of steps (a) and (b) is carried out at a temperature of about 40–115° C.

References Cited
UNITED STATES PATENTS
3,707,586   12/1972   Turley _____ 260—928
2,866,809   12/1958   Kolka _____ 260—977

LORRAINE A. WEINBERGER, Primary Examiner

R. L. RAYMOND, Assistant Examiner

U.S. Cl. X.R.

260—928, 977, 985

PO-1050
(5/69)

UNITED STATES PATENT OFFICE
CERTIFICATE OF CORRECTION

Patent No. 3,803,272            Dated April 9, 1974

Inventor(s) Philip M. Pivawer, Richard J. Turley and Philip D. Hammond

It is certified that error appears in the above-identified patent and that said Letters Patent are hereby corrected as shown below:

Claim 1, step (b) "10°" should read "-10°".

Signed and Sealed this first Day of June 1976

[SEAL]

Attest:

RUTH C. MASON
*Attesting Officer*

C. MARSHALL DANN
*Commissioner of Patents and Trademarks*